Dec. 16, 1930.          W. J. McLACHLAN          1,785,710
SYSTEM OF ELECTRIC DISTRIBUTION
Original Filed March 19, 1929
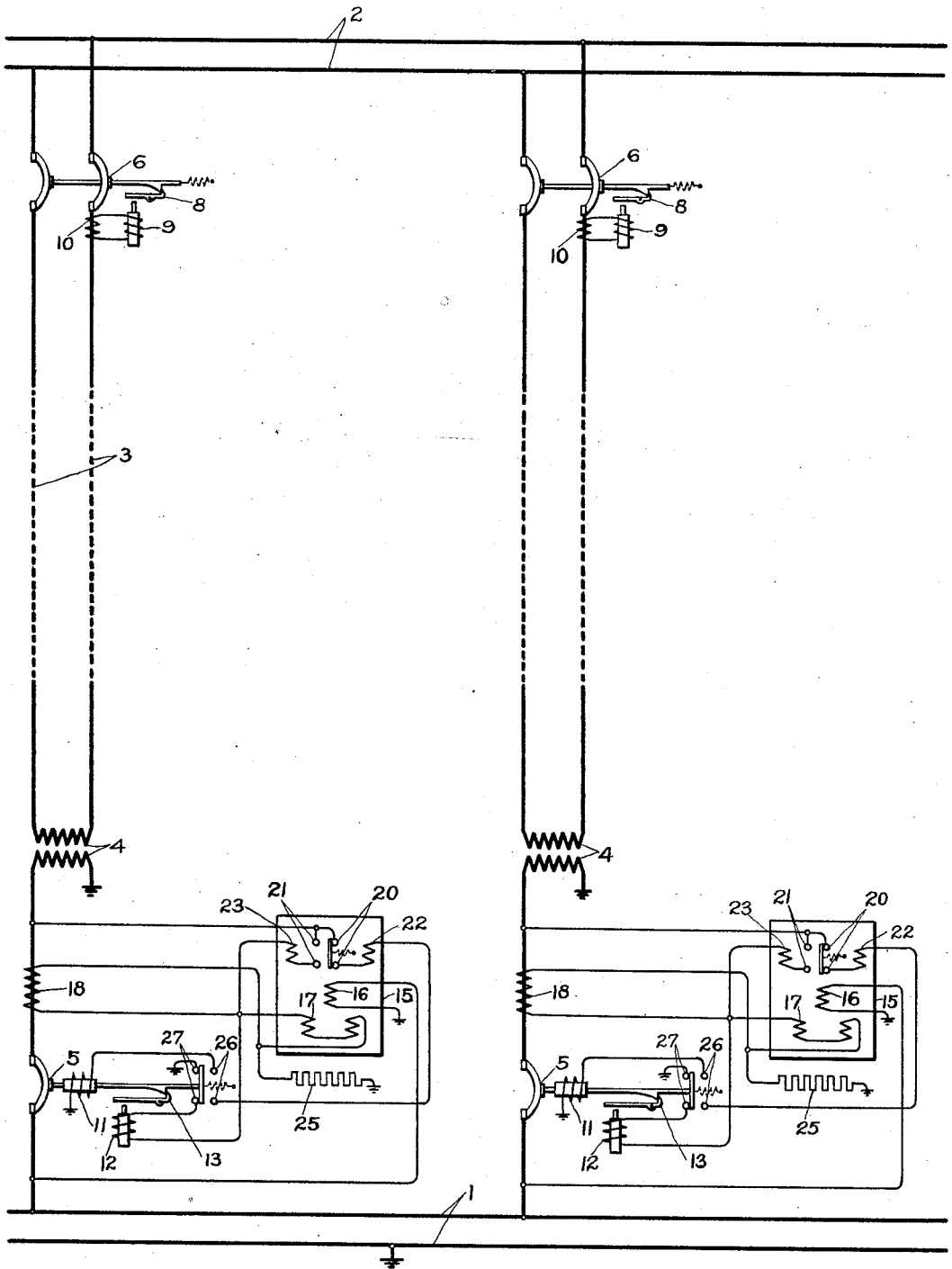
Inventor:
Willard J. McLachlan,
by Charles E. Mullen
His Attorney.

Patented Dec. 16, 1930

1,785,710

UNITED STATES PATENT OFFICE

WILLARD J. McLACHLAN, OF SCHENECTADY, NEW YORK, ASSIGNOR TO GENERAL ELECTRIC COMPANY, A CORPORATION OF NEW YORK

SYSTEM OF ELECTRIC DISTRIBUTION

Application filed March 19, 1929, Serial No. 348,340. Renewed October 6, 1930.

My invention relates to systems of electric distribution and particularly to alternating current networks in which current is supplied thereto at various points by means of step-down transformers, the primary windings of which are connected to feeder circuits fed from the same or different sources of current. In such systems, it is desirable to be able to disconnect a transformer from the network when a fault occurs in the transformer or on the associated feeder circuit and automatically to reconnect the transformer to the network when the feeder circuit voltage is restored to normal.

Various arrangements employing a power directional relay responsive to the flow of power between a transformer and the network have been used to effect the disconnection of the transformer in response to abnormal conditions in the transformer and feeder circuit. In such systems, however, certain abnormal conditions may occur which cause sufficient reverse power to flow to effect the opening of the circuit breaker between the transformer and the network, and which do not effect the deenergization of the associated transformer so that the circuit breaker between the transformer and the network is immediately reclosed. One object of my invention is to provide an improved arrangement for preventing the periodic opening and closing of the circuit breaker between the transformer and the network under such abnormal conditions.

In accordance with my invention, I provide an arrangement whereby the power directional relay when it is in its circuit breaker opening position completes an energizing circuit for one of its operating coils so that after the transformer is disconnected from the network, the power directional relay is maintained in its circuit breaker opening position as long as the transformer remains energized.

My invention will be better understood from the following description taken in connection with the accompanying drawing and its scope will be pointed out in the appended claims.

Referring to the drawing which is a diagram of a network system embodying my invention, 1 is an alternating current network which is arranged to be supplied with electric energy from a suitable supply circuit 2 by means of a plurality of feeder circuits 3, two of which are shown in the drawing. In order to simplify the disclosure, single-phase circuits are shown but it is obvious that my invention is applicable to polyphase circuits.

Each feeder circuit 3 includes a step-down transformer 4 the low voltage secondary winding of which is arranged to be connected to the network by means of a suitable circuit breaker 5 and the primary winding of which is arranged to be connected to the supply circuit 2 by means of a suitable circuit breaker 6. The transformers 4 and the secondary circuit breakers 5 are usually located near the network 1 whereas the primary circuit breakers 6 are usually in the main station or substation containing the supply circuit 2.

The circuit breakers 6, which may be of any suitable type, examples of which are well known in the art, are preferably arranged so that they are opened in response to overload conditions on the respective feeder circuits. As shown, each circuit breaker 6 is an overload circuit breaker of the well known latched-in type and is adapted to be opened by releasing a latch 8 either manually or automatically by means of an overload relay 9 which is connected in series relation with the respective feeder circuit 3 by means of a current transformer 10. Any suitable means, either manually or automatically controlled, may be provided for closing the circuit breaker.

The circuit breakers 5 may be of any suitable type, examples of which are well known in the art. As shown in the drawing, each circuit breaker 5 is of the well known latched-in type and includes a closing coil 11 which when energized closes the circuit breaker and a trip coil 12 which when energized releases a latch 13 which holds the circuit breaker in its closed position.

In order to effect the opening of a secondary circuit breaker 5 when a fault occurs in the associated transformer 4 or feeder circuit 3, each circuit breaker 5 has associated therewith a power directional relay 15 which is arranged to effect the energization of the trip coil 12 of the circuit breaker when a predetermined amount of reverse power flows from the network to the associated feeder circuit. The power directional relays 15 may be of any suitable type, examples of which are well known in the art. As shown, each power directional relay includes a potential winding 16 which is permanently connected across the network 1 and a current coil 17 which is permanently connected across the secondary winding of a current transformer 18, the primary winding of which is connected in series relation with the associated power transformer secondary and the network when the associated circuit breaker 5 is closed. Each power directional relay 15 is arranged so that normally it maintains closed its contacts 20 which are in the energizing circuit of the closing coil 11 of the associated circuit breaker 5. When, however, more than a predetermined amount of reverse power flows from the network 1 to a feeder circuit 3 the associated power directional relay 15 is arranged to open its contacts 20 and closes its contacts 21 which are in an energizing circuit for the trip coil 12 of the associated circuit breaker 5.

Each power directional relay 15 is also preferably provided with holding windings 22 and 23 which are respectively connected in series with the contacts 20 and 21 thereof so that the holding windings tend to maintain their respective contacts closed as long as current flows through them. It is obvious, however, that so far as my invention is concerned these holding coils may be omitted.

In order to prevent the periodic closing and opening of a circuit breaker 5 when a condition occurs on the associated feeder circuit 3 which causes the opening of the circuit breaker 5 but which does not effect the deenergization of the associated transformer 4, I arrange the connections of the current coil 17 of the power directional relay 15 so that the current coil is connected across the secondary of the associated transformer 4 when the power directional relay contacts 21 are closed. Preferably a suitable impedance such as a resistor 25 is connected in the energizing circuit of the current coil 17 which is connected across the power transformer secondary so that the torque produced by the currents in the windings 16 and 17 is sufficient to maintain the relay contacts 21 closed as long as the transformer secondary voltage remains above a predetermined value after the relay contacts 21 are closed.

The operation of the arrangement shown is as follows: When both of the circuit breakers 5 and 6 in any feeder circuit are open, the power directional relay associated with the open circuit breaker 5 is in the position shown in the drawing so that the closing coil 11 of the open circuit breaker 5 is connected across the secondary winding of the deenergized transformer 4. This circuit of the closing coil 5 also includes the auxiliary contacts 26 on the open circuit breaker 5. Therefore, when the associated circuit breaker 6 is closed so that the transformer 4 is reenergized the closing coil 11 of the open circuit breaker 5 closes this circuit breaker 5 and reconnects the secondary winding of the transformer 4 to the network 1. When the circuit breaker 5 closes, the closing coil 11 is deenergized by the opening of the auxiliary contacts 26 on the circuit breaker.

When a fault occurs on any feeder, the abnormal current which flows from the supply circuit 2 through the circuit breaker 6 in the faulty feeder to the fault, causes the overcurrent relay 9 in the faulty circuit to release the latch 8 controlled thereby so that the circuit breaker 6 opens to disconnect the faulty feeder from the supply circuit 2.

Current is also supplied to the fault from the network 1 through the secondary circuit breaker 5 in the faulty feeder so that the power directional relay 15 associated therewith opens its contacts 20 and closes its contacts 21. The closing of the contacts 21 connects the trip coil 12 and the auxiliary contacts 27 on the circuit breaker 5 in the faulty circuit and the holding winding 23 in series across the secondary winding of the transformer 4 so that the circuit breaker 5 opens and disconnects the faulty feeder from the network 1.

The closing of the relay contacts 21 also connects the current winding 17 of the relay and the resistor 25 in series with holding coil 23 across the secondary of the transformer 4 so that as long as the power transformer 4 remains energized after the circuit breaker 5 is opened, the contacts 21 of power directional relay 15 are maintained closed. Therefore there is no possibility of the circuit breaker 5 pumping in cases where it opens under conditions when the associated transformer 4 remains energized after opening thereof.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, two electric circuits, a switch connecting said circuits, a power directional relay for controlling the opening of said switch having a voltage coil connected to one of said circuits and a current coil connected in series relation with said circuits when said switch is closed, and means controlled by said relay for effecting the connection of said current coil across said other of said circuits when said relay is in a position to effect the opening of said switch whereby said relay is maintained in said position as long as said other circuit is energized after said switch is opened.

2. In combination, two electric circuits, a switch connecting said circuits, a power directional relay for controlling the opening of said switch having a voltage coil connected to one of said circuits and a current coil connected in series relation with said circuits when said switch is closed, an impedance, means controlled by said relay for effecting the connection of said impedance and said current coil in series across said other of said circuits when said relay is in a position to effect the opening of said switch whereby said relay is maintained in said position as long as said other circuit is energized after said switch is opened, and means controlled by said relay when it is in another position for effecting the closing of said switch in response to the voltage of said other circuit.

3. In combination, an alternating current supply circuit, an alternating current load circuit, a transformer interconnected between said circuits, a circuit breaker between said transformer and load circuit, a power directional relay for controlling the opening of said circuit breaker having a voltage coil connected across one of said circuits, and a current coil connected in series relation between said transformer and load circuit when said circuit breaker is closed, an energizing circuit for said current coil, and contacts in said energizing circuit arranged to be completed by said relay when it is in a position to effect the opening of said circuit breaker.

4. In combination, an alternating current supply circuit, an alternating current network, a power transformer interconnected between said circuit and network, a circuit breaker between said transformer and network having a trip coil, a power directional relay having a voltage coil connected across said network and a current winding connected in series relation between said transformer and network, an energizing circuit for said trip coil, an energizing circuit for said current coil adapted to be connected across the network terminals of said transformer, and contacts in the energizing circuits of said trip and current coils arranged to be closed by said relay when power flows from said network to said transformer.

5. In combination, an alternating current supply circuit, an alternating current network, a power transformer interconnected between said circuit and network, a circuit breaker between said transformer and network having a trip coil, a power directional relay having a voltage coil connected across said network and a current winding connected in series relation between said transform- er and network, an energizing circuit for said trip coil, a resistor, an energizing circuit for said current coil including said resistor adapted to be connected across the network terminals of said transformer, and contacts in said energizing circuits arranged to be closed by said relay when power flows from said network to said transformer.

6. In combination, an alternating current supply circuit, an alternating current network, a power transformer interconnected between said circuit and network, a circuit breaker between said transformer and network having a trip coil, a current transformer having its primary winding connected in series relation with said transformer and network when said circuit breaker is closed, a power directional relay having a voltage coil connected across said network and a current coil connected across the secondary winding of said current transformer, a resistor connected between one terminal of said current winding and one of the network terminals of said power transformer, means controlled by said power directional relay for effecting the completion of an energizing circuit for said trip coil when power flows from said network to said transformer, and contacts controlled by said relay for effecting the connection of the other terminal of said current coil to the other network terminal of said power transformer when said relay is in a position to effect the energizing of said trip coil.

In witness whereof, I have hereto set my hand this 18th day of March, 1929.

WILLARD J. McLACHLAN.